United States Patent
Avrahami et al.

(10) Patent No.: US 11,568,369 B2
(45) Date of Patent: Jan. 31, 2023

(54) SYSTEMS AND METHODS FOR CONTEXT AWARE REDIRECTION BASED ON MACHINE-LEARNING

(71) Applicant: FUJIFILM Business Innovation Corp., Tokyo (JP)

(72) Inventors: Daniel Avrahami, Mountain View, CA (US); Matthew Lee, Mountain View, CA (US); Scott Cambo, Evanston, IL (US)

(73) Assignee: FUJIFILM Business Innovation Corp., Tokyo (JP)

( * ) Notice: Subject to any disclaimer, the term of this patent is extended or adjusted under 35 U.S.C. 154(b) by 1081 days.

(21) Appl. No.: 15/405,982

(22) Filed: Jan. 13, 2017

(65) Prior Publication Data

US 2018/0204128 A1    Jul. 19, 2018

(51) Int. Cl.
*G06N 20/00* (2019.01)
*G06Q 10/10* (2012.01)

(52) U.S. Cl.
CPC ........... *G06Q 10/109* (2013.01); *G06N 20/00* (2019.01)

(58) Field of Classification Search
CPC .......... G06N 5/04; G06N 99/00; G06N 5/047; G06N 99/005; H04L 67/22; G06F 19/3481; A61B 5/1118; G01C 22/006
See application file for complete search history.

(56) References Cited

U.S. PATENT DOCUMENTS

| | | |
|---|---|---|
| 8,935,123 B2 | 1/2015 | Yuen et al. |
| 9,094,539 B1 * | 7/2015 | Noble .................. H04W 88/02 |
| 9,204,257 B1 | 12/2015 | Mendelson |
| 10,292,585 B1 * | 5/2019 | Talwai .................. G16H 40/67 |
| 2009/0030767 A1 | 1/2009 | Morris et al. |
| 2011/0065504 A1 * | 3/2011 | Dugan et al. ........... A63F 13/00 463/31 |
| 2015/0251074 A1 * | 9/2015 | Ahmed et al. ......... A63B 71/06 |
| 2016/0234595 A1 | 8/2016 | Goran et al. |
| 2016/0259426 A1 * | 9/2016 | Yuen et al. ............. G06F 3/017 |

(Continued)

FOREIGN PATENT DOCUMENTS

| | | |
|---|---|---|
| JP | 2005131024 A | 5/2005 |
| JP | 2010511218 A | 4/2010 |
| JP | 2011118736 A | 6/2011 |

OTHER PUBLICATIONS

Smith et al., "Integrating Planning and Dialogue in a Lifestyle Agent," IVA 2008, LNAI 5208, pp. 146-153, 2008. (Year: 2008).*

(Continued)

*Primary Examiner* — Luis A Sitiriche
(74) *Attorney, Agent, or Firm* — Procopio, Cory, Hargreaves & Savitch LLP

(57) ABSTRACT

Example implementations are directed to a method of receiving information associated with an activity, analyzing the information to identify a first pattern and a second pattern, and generating a customized recommendation model for the second pattern based on the first pattern. In response to a detected trigger indicating a transition to the second pattern, the method assesses context factors to verify the transition to the second pattern without interrupting the first pattern. Based on the verification, the method applies the model to provide redirection based on the recommendation.

21 Claims, 11 Drawing Sheets

(56) References Cited

U.S. PATENT DOCUMENTS

2017/0278034 A1* 9/2017 Kodeswaran et al. .................. G06Q 10/06

OTHER PUBLICATIONS

"A Review of Design and Policy Interventions to Promote Nurses' Restorative Breaks in Health Care Workplaces" Nejati et al (Year: 2016).*

Kirkham, R., et al.. The Break-Time Barometer—An Exploratory System for Workplace Break-time Social Awareness, ACM International Joint Conference on Pervasive and Ubiquitous Computing UbiComp '13, Sep. 8-12, 2013, Zurich, Switzerland, 10 pgs.

Epstein, D. A., et al., Taking 5: Work-Breaks, Productivity, and Opportunities for Personal Informatics for Knowledge Workers, CHI '16 Proceedings of the 2016 CHI Conference on Human Factors in Computing Systems, Santa Clara, CA, May 7-12, 2016, pp. 673-684.

Notice of Reason for Refusal for related JP App No. 2017-142215 dated Jun. 8, 2021, 5 pgs.

* cited by examiner

SYSTEMS AND METHODS FOR CONTEXT AWARE REDIRECTION BASED ON MACHINE-LEARNING

BACKGROUND

Field

The present disclosure is generally directed to machine-learning, and more specifically, to systems and methods for providing context aware redirection based on machine-learning.

Related Art

In related art implementations, there are machine-learning approaches to recommending to a user when to take a break. Conventionally, people take breaks from work activities to service a need or rest before returning to the activity. Typically, the break activities a person does during the break can greatly impact a person's productivity after returning to the work activity.

Technical approaches to using breaks to improve productivity typically involve interrupting the person from their work activity to take a break. However, prompts that interrupt a person from their work activity to suggest breaks might come during a period of productivity, and thereby reduce any net productivity gained by taking the break. Accordingly, a person may not be ready to take a break, but may cease being productive in response to the prompts.

In the related art, "exergaming" generally refers to video games that are also a form of exercise. Typically, exergaming incorporates a form of exercise to provide a virtual or simulated experience of physical exertion, such as swinging one's arms to simulate a swinging a tennis racket. Some exergames incorporate tracking and fitness sensors as part of the video game experience, but do not account for activity before and after the person plays the exergame.

Performing activity that is voluntary during a break has been shown to improve the person's productivity when returning to the work activity. Therefore, it may be desirable to develop systems and methods that do not interrupt periods of productive work activity and improve the person's readiness to return to the activity.

SUMMARY

Example implementations described herein provide systems and methods including receiving information associated with an activity of a user; analyzing the information to identify a first pattern and a second pattern; generating a customized recommendation model for the second pattern based on the first pattern; and in response to a detected trigger indicating a transition to the second pattern, assessing context factors to verify the transition to the second pattern without interrupting the first pattern, and based on the verification, applying the model to provide redirection based on the recommendation. The information can include one or more of sensed data, pinpoint data, and environment data. For example, the information includes one or more of location data, physiological data, computer usage, phone usage, sensor data, etc.

In an example implementation, analyzing the information includes identifying triggers that indicate a transition from the first pattern to the second pattern; and recognizing context factors associated with the first pattern that are inconsistent with the second pattern. For example, to detect a trigger, the method monitors sensed data associated with the user, such as tracking the user's body movements, location, eye gaze, etc. The detected trigger can be evaluated in view of context factors to determine whether the detected trigger indicating a transition from the first pattern to the second pattern is inconsistent with other information. For example, assessing context factors to verify the transition to the second pattern can include identifying sensed data, pinpoint data, environment data, etc. associated with the first pattern that overrides the trigger.

An example aspect of the present disclosure includes using machine-learning to generate the customized recommendation model based on one or more parameters, such as training data, user preferences, environmental controls, clinical guidelines, safety regulations, social graphs, etc. Additionally, according an example aspect of the present disclosure, output of the model is passively provided so as to not interrupt the first pattern.

According to example implementations, the method includes receiving feedback information associated with the second pattern; and updating the model based on the received feedback information. For example, the feedback information can include one or more of a duration for returning to the first pattern, tracked co-presence of another user, user location data, user survey, post-break activity, etc. According to example implementations, providing redirection includes a recovery plan for one or more of mental stimuli, physical stimuli, and social stimuli. For example, a recovery plan can include displaying an electronic game that directs the user to a location within a workplace setting.

The example implementations also include a system to receive information associated with an activity; analyze the information to identify a first pattern and a second pattern; generate a customized recommendation model for the second pattern based on the first pattern; and in response to a detected trigger that indicates a transition to the second pattern, assess context factors to verify the transition to the second pattern without interrupting the first pattern, and based on the verification, apply the model to provide the redirection based on the recommendation.

A non-transitory computer readable medium, comprising instructions that when executed by a processor, the instructions apply the model to provide the redirection based on the recommendation is also provided by the example implementations.

Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
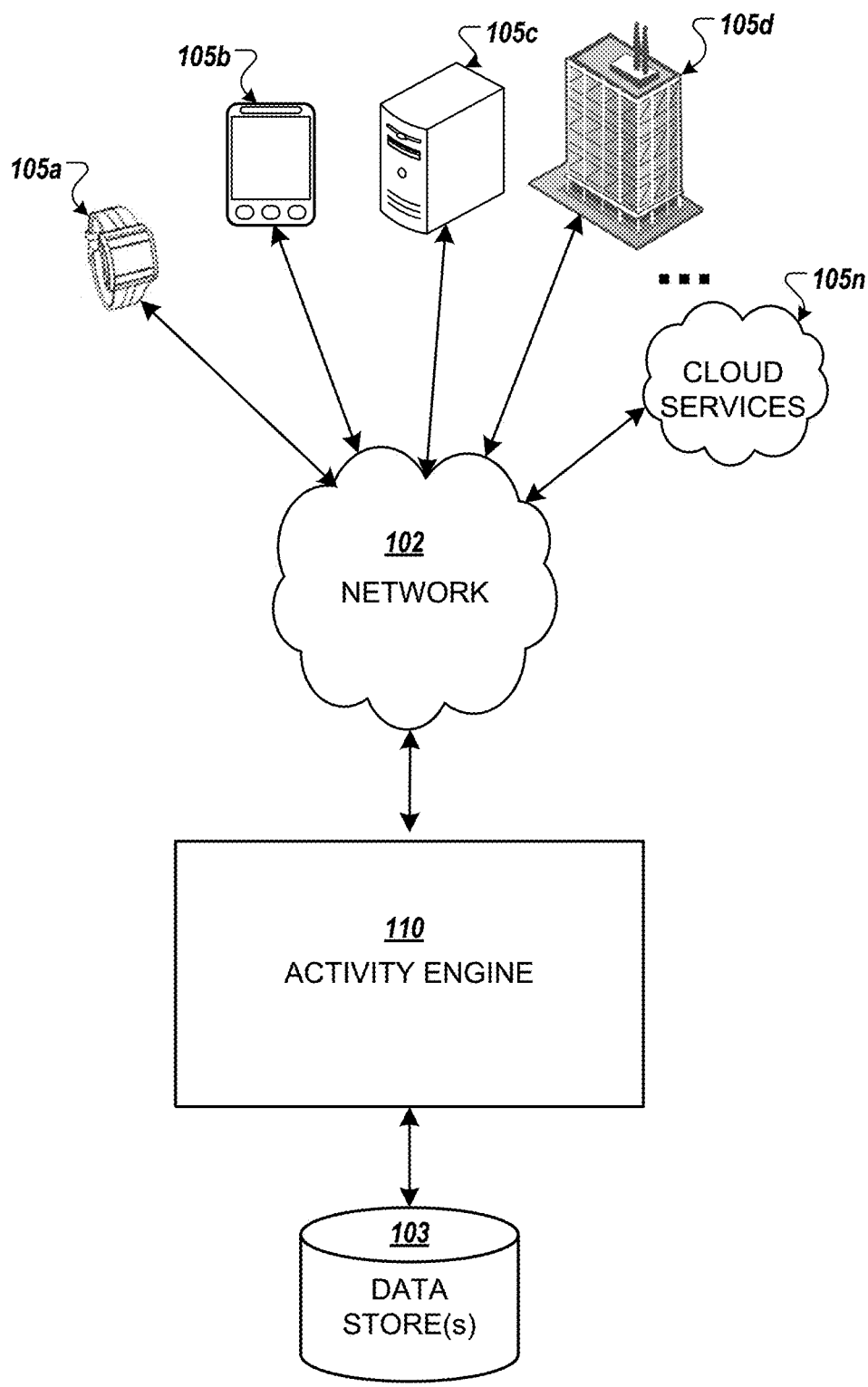
FIG. 1 illustrates an overview of a system in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

An example aspect facilitates improving a person's readiness to return to a work activity by the system learning the person's patterns, and providing a recommendation associated with a break activity. In an example implementation, a person in a workplace can be detected as ready to take a break and can receive a recommendation that redirects the person to perform recovery activities that may enhance the break.

Accordingly, example implementations of the methods and systems associated with the present inventive concept are directed to analyzing information associated with an activity, to identify the first pattern and the second pattern. For example, the first pattern can be associated with work activities of the user and the second pattern can be associated with break activities of the user.

An example implementation includes generating a customized recommendation model for the second pattern based on the first pattern. As the system learns the user's patterns, the system can observe correlations between the first pattern and second pattern to discern recovery activities (i.e., a recovery plan) that contribute to positive performances during each pattern (e.g., feedback). The customized recommendation model can provide the recovery activity to redirect the user during the second pattern.

For example, when the first pattern includes a number of sedentary activities (e.g., working at a desk), the customized recommendation model for the second pattern can provide a physical recovery activity (e.g., a travel route) to redirect the user when the user transitions from the first pattern to the second pattern (e.g., during break activities), as described in greater detail below. Further, output of the recommendation is passively provided without interrupting the user engaged in the first pattern of activity.

In an example implementation, a transition trigger is detected that indicates a transition from the first pattern to the second pattern. More specifically, the example implementation includes using context factors to verify the transition to the second pattern, without interrupting the first pattern. For example, a user leaving his or her office may indicate a transition to a break activity (e.g., the second pattern); upon inspection of the user's calendar data, the system can determine that the user is leaving to attend a meeting (e.g., the first pattern) and not interrupt the user's productivity with a recovery activity. In another example, inspection of the user's mobile device usage, such as launching a streaming video service, can verify that the trigger indicates a transition to a break.

In response to the user transitioning to the second pattern, the recommendation redirects the user to perform a recovery activity. For example, the recommendation can provide the user with an option for a physical activity, such as a travel route, as an alternative break activity to the streaming video service. As described in greater detail below, the customized recommendation model is generated using machine-learning that applies, for example, training data, user preferences, environmental controls, clinical guidelines, safety regulations, social graphs, etc.

Aspects of the example implementation are directed to use of information that includes sensed data (e.g., from a wearable device, camera, etc.), pinpoint data (e.g., location tracking, computer usage, calendar schedule, social graphs, etc.), and environmental data (e.g., local weather, building layout, internal climate control, conference room schedules, corporate policies, etc.) The information can be used to detect patterns of a user's activity or behaviors and develop a context-sensitive recommendation model for a recovery plan. The model generates recommendations to perform the recovery plan based on the first pattern. Further, the example implementations are directed to incorporating feedback information, productivity measurements, and sensed data, to refine the recommendation model.

The present inventive concept includes passively providing the recommendation to the user, so as to not interrupt pre-break productivity during the first pattern. Example implementations are directed to detecting a trigger that indicates a break, where the trigger is based on sensed data associated with the user, and verifying that the trigger is associated with a transition between the first pattern and second pattern based on context parameters, such as pinpoint data and/or environment data. In response to determining that the trigger indicates a transition to the second pattern, the system provides an output of the recommendation model for the second pattern.

An aspect of the example implementation is described in reference to a workplace setting, such as an office environment, assembly line, construction site, retail stand, etc. However, the scope of the example implementations is not limited to a specific environment, and other environments may be substituted therefor without departing from the inventive scope. For example, but not by way of limitation, other environments in which the recovery activity can be conducted can include recreational environments other than an office or workplace, such as a gym, as well as therapeutic environments (e.g., hospitals, physical therapy centers, etc.), but are not limited thereto.

FIG. 1 illustrates an overview of a system 100 in accordance with an example implementation. The system 100 includes an activity engine 110 configured to communicate with one or more client devices 105a-105n to provide a context aware recovery recommendation to a user. The activity engine 110 may be implemented in the form of software (e.g., instructions on a non-transitory computer readable medium) running on one or more processing devices, such as the one or more client devices 105a-105d, as a cloud service 105n, remotely via a network 102, or other configuration known to one of ordinary skill in the art.

The terms "computer", "computer platform", processing device, and client device are intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks.

The activity engine 110 directly or indirectly includes memory such as data store(s) 103 (e.g., RAM, ROM, and/or internal storage, magnetic, optical, solid state storage, and/or organic), any of which can be coupled on a communication mechanism (or bus) for communicating information.

In an example implementation, the activity engine 110 can be hosted by a cloud service 105n and communicatively connected via the network 102 to client devices 105a-105n in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Data associated with the user, or the environment of the user, may come from different types of client devices 105a-105n. Client devices 105a-105n can include, for example, sensor systems 105a (e.g., wearable technology including fitness trackers, physiological sensors, biometric sensors, location sensors, GPS units, Bluetooth® beacons, cameras, etc.), mobile computing devices 105b (e.g., smart phones, laptops, tablets, etc.), computing devices 105c (e.g., desktops, mainframes, network equipment, etc.), location based systems 105d (e.g., control systems, building environment control devices, security systems, corporate infrastructure, etc.), as well as cloud services 105n (e.g., remotely available proprietary or public computing resources).

Client devices 105a-105n can include client services with functionality, for example, to collect and/or store sensed data, track locations, manage communications with external devices, and so forth. For example, a mobile computing device 105b can include client services to observe a user with a camera, to monitor heart rate information with a wearable sensor system 105a on the user, to collect an organization structure from a corporate mainframe, etc. In example implementations, the activity engine 110 receives information from multiple client device 105a-105n.

Client devices 105a-105n may also collect information from one or more other client device 105a-105n and provide the collected information to the activity engine 110. For example, client devices 105a-105n can be communicatively connected to the other client device using WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

In an example implementation, the user may be located in an office environment that includes one or more client devices 105a-105n, and the user performs a work activity (e.g., a first pattern) and a break activity (e.g., a second pattern) that is monitored by client services. While the user is performing the work activity, such as operating a device such as computer at a desk or moving items in a warehouse, the client services gather different types of information associated with the user that are communicated to the activity engine 110.

For example, location sensors receive the user's movement in the office or warehouse, a scheduling application provides the user's meeting schedule, a wearable device obtains a user's heart rate, and the information is sent to the activity engine 110.

When the user is ready to go on a break from the work activity during the first pattern, the activity engine 110 can detect a trigger that indicates the second pattern (e.g., break activities) using the information. As described in greater detail below, in the example implementation, the activity engine 110 generates a customized recommendation model based on learning the user's patterns. In example implementation, the customized recommendation model is generated using training data, rules, feedback, etc.

The customized recommendation model can output direction for the user to perform different recovery activities (e.g., a recovery plan) in response to determining that the user has transitioned to the second pattern (e.g., break activities). For example, when a user in the office leaves their desk to take a break, a user's mobile device may launch an application that recommends and directs the user to travel to different locations around the office as physical stimuli that aids in recovering from the work activity. In an example implementation, the user is incentivized to perform the recommended activity through a gamification of the break or reward program.

In another example, when a user (e.g., in a warehouse) sits down to take break, the user's mobile device may launch an application that recommends and directs the user to perform a stretching activity, or provides media content as a mental stimuli that aids in recovering from the work activity. In the examples, the user may be rewarded with tokens, points, or credits in a game setting or towards a rewards program.

Additionally, in some examples, the user's heart rate is monitored during the first pattern and second pattern as feedback to the model, to improve subsequent recovery plans. For example, when a physically challenged patient is performing physical therapy, the activity engine 110 can recommend and direct the user to perform a set number of exercises based on the user's sensed biometric data during the previous physical therapy session.

Accordingly, the user's break activity is enhanced using the information collected by the client services. Through machine-learning, the activity engine 110 generates recommended recovery plans that the user can perform to redirect their break activities. The suggested recovery plans can include mental, physical, or social stimuli that the user's activity or behavior patterns indicate may increase the user's readiness to return to the first pattern (e.g., work activities) after the redirection.

Figure 2:
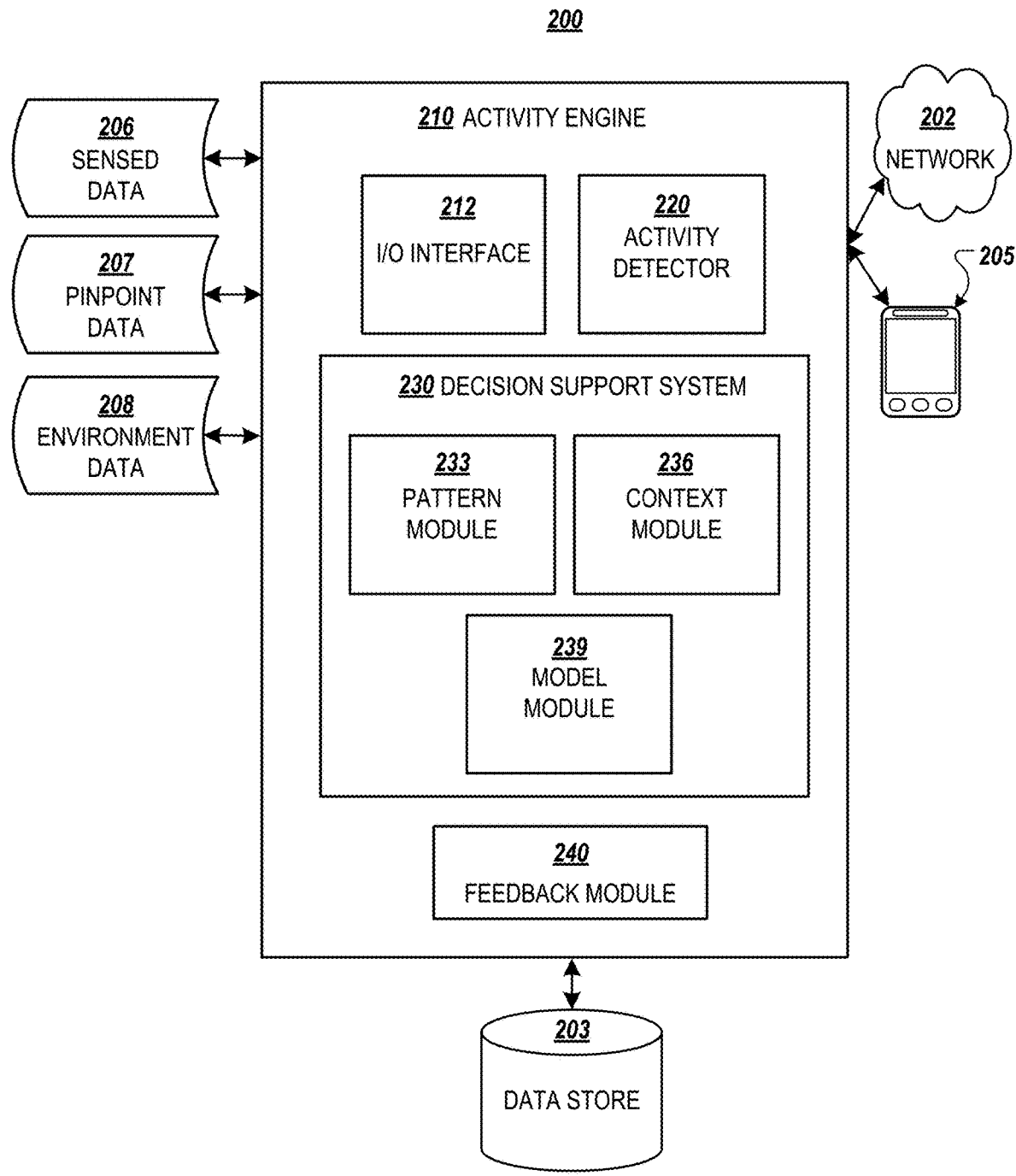
FIG. 2 illustrates an example activity engine in accordance with an example implementation.

FIG. 2 illustrates an example system 200 including an activity engine 210 in accordance with an example implementation. The activity engine 210 includes one or more I/O interfaces 212, an activity detector 220, a decision support system 230, and a feedback module 240. The activity engine 210 is coupled to one or more data stores 203 for storing data (e.g., information, models, feedback, user profiles, etc.).

In an example implementation, the I/O interface 212 includes one or more communication interfaces communicatively connected with different types of client devices 205 (e.g., client devices 105a-105n of FIG. 1) directly or via a network 202 in order to receive information associated with an activity (e.g., sensed data 206, pinpoint data 207, and/or environment data 208).

The I/O interface 212 can receive data from different types of client devices 205 (e.g., client devices 105a-105n) or client services. Further, each client device 205 can provide multiple types of data, for example, sensed data 206, pinpoint data 207, and/or environment data 208. The activity engine 210 receives, via the I/O interface 212, information such as monitored data, applications data, etc., and analyzes the information, via the decision support system 230, to identify a user's patterns (e.g., a first pattern and a second pattern).

Sensed data 206 can include information about the user's physical activities. For example, a user may carry a mobile device 205 with various sensors that collect a user's movements, sleeping behaviors, eating behaviors, etc.

Pinpoint data 207 can include stored information about the user's first pattern and second pattern. In an example implementation, monitoring software can collect information about the user's digital interactions. For example, the monitoring software can collect a user's computer usage, machine interactions, communication patterns, scheduling information, etc.

Environment data 208 (e.g., ambient data) can include information about a location or organization associated with the first pattern and second pattern. In an example implementation, services can provide environment data regarding the physical layout of the location, relationships between the people at the location, weather information, safety information, location based policies, etc. For example, in an office, environment data can include the office layout, organizational structure of workers, facilities and designated break areas, as well as information regarding employer break policies.

The activity engine 210 can interact with one or more client services to receive inputs associated with a particular user, as well as inputs that can be used for multiple users sharing a common environment. For example, client services can provide environmental data from, for example, a building sensor system that includes location information for multiple users at a location; pinpoint data from, for example, workstation computers for each user at the location; and sensed data from, for example, personalized health tracking sensors.

The activity detector 220 can monitor activity associated with the user. In some implementations, the activity detector 220 is included in the activity engine 210, may be hosted by a client device 105a-105n, and may notify the activity engine 210 of data (e.g., information) associated with the activities of the user. In an example implementation, the activity detector 220 tracks user activity to identify changes in particular levels of activity. For example, the activity detector 220 can monitor data from a heart rate sensor, track a user's heart rate data, and identify a change in the user's level of activity, based on a change in the user's heart rate that satisfies a threshold, percentage, deviation, etc.

The activity detector 220 monitoring the user's activity can be configured to detect changes associated with the user's patterns. For example, to detect that the user is transitioning between patterns, the activity detector 220 can be configured to track the user's location and signal to the activity engine 210 when the user's location changes.

For example, cameras may be used to make a determination as to the eye gaze of the user, determine head orientation, pupil dilatation, etc. Functionally, the cameras receive the activity that the user is performing and can be observed on-display, as well as looking at computer-based events. In an example, the user may be out of view of a camera (e.g., user writing on a marker board) and different types of sensors can be used to track physical activity, such as user movement by skeleton tracking.

The decision support system (DSS) 230 can include a pattern module 233, a context module 236, and a model module 239. In an example implementation, the decision support system 230 includes a training process to learn patterns of the user's activity or behaviors and generates recommendation models to redirect the user. The pattern module 233 analyzes received data (e.g., sensed data, pinpoint data, environment data, etc.) associated with a particular user to identify the first pattern (e.g., work activities) and the second pattern (e.g., break activities). The context module 236 determines context factors from the data to verify a transition to the second pattern. The model module 239 generates a customized recommendation model for the second pattern based on the first pattern. In an example implementation, the DSS 230 can analyze data from a set of users within a common environment to develop baseline patterns and modules that are customized via input from the feedback module 240.

To identify a first pattern and a second pattern associated with the user, the pattern module 233 is configured to analyze the received data (e.g., information associated with an activity). In an example implementation, the pattern module 233 can categorize the user's activities as associated with the first pattern and second pattern. For example, the pattern module 233 labels and categorizes different events and associate actions, messages, and/or commands. In an example implementation, the DSS 230 uses machine-learning-based detection of patterns by the pattern module 233. In an example implementation, the user can mark activities, time periods, locations, etc. with labels and/or categorizes to indicate the first pattern and the second pattern. In some examples, the system 200 marks activities as associated with the first pattern and second pattern and the user may modify or change the system's markings to provide feedback or error correct.

In an example implementation, the time away from the desk can be categorized as break vs. work, as short vs. not-short, social vs. not social, etc. If the majority of time away from the desk is spent in a meeting room, or if the time away from the desk corresponds to an event in the user's calendar, the time may be categorized as "Work" associated with the first pattern. If the time away from the desk is below a time threshold (e.g., 2 minutes) then the time away from the desk may be categorized as a 'short break'. Categorization of the information can be used to help identify the patterns, improve timing of the recommendations, and enhance the type of recommendations that improve the user's readiness to resume work. For example, identifying factors indicating a short break may be used to recommend easy recovery activities that are located close to the user's desk. If the work time away from the desk was spent with other coworkers, the time away from the desk can be categorized as 'work' and/or 'social'. The social factor may be used to recommend a solitary recovery activity, as discussed below.

In an example implementation, the pattern module 233 uses a set of training data to associate received data with the first pattern and second pattern. The set of training data can includes a collection of positive examples and negative examples of the first pattern, as well as positive examples and negative examples of the second pattern. A positive example can be categorized as consistent with the pattern and a negative example can be categorized as inconsistent with the pattern. Sets of training data can be developed based on the environment of the user. For example, a set of training data for an office environment may include positive examples of the first pattern such as sitting at a desk, talking to a business contact, using a business computer applications, etc. Negative examples of the first pattern can include leaving a cubicle, picking up a personal item, activating a social media website, etc. Additionally, the set of training data for the office environment includes positive examples of the second pattern, such as being located in a break area, talking to a personal contact, etc. Negative examples of the second patterns may include entering a conference room, talking to a business contact, carrying a notepad, activating a work related mobile application, etc.

In another example, a set of training data for a construction environment includes positive examples of the first pattern, such as being located in an active work zone, operating heavy machinery, holding a sign, etc. Negative examples of the first patterns can include sitting down in a rest zone, picking up a personal item, removing a piece of safety equipment, etc.

The pattern module 233 also analyzes the information to identifying triggers that indicate a transition from the first pattern to the second pattern. For example, the pattern module 233 can analyze the received data to identify triggers that indicate a transition by comparing detected levels of activity that indicate a change between the patterns. In an example, a user detected as leaving their desk may be categorized a trigger indicating the user is transition to a break (e.g., second pattern). The pattern module 233 can generate instructions for the activity detector 220 to detect triggers.

The activity detector 220 is configured to detect the triggers, such as a change in sensed data 206. Based on the triggers identified by the pattern module 233, the activity detector 220 monitors for changes in data that indicate a transition to the second pattern (e.g., the user has started a break). The detected triggering data may include, for example, a time of day, leaving a desk, closing a particular computer application, using a personal item such as a mobile phone, using a peripheral device such as a printer, or performing an involuntary behavior, such as a yawn or eye movement, etc. Some negative examples of the first pattern may or may not align with positive examples of the second pattern and vice versa. Thus, the context module 236 of DSS 230 develops rules that can include assigning a weighting factor to a trigger based on additional parameters through the machine-learning process.

The context module 236 uses the data (and feedback from the feedback module 240) to recognize context factors that the DSS 230 can use for verifying that a transition to the second pattern does not interrupt the first pattern. For example, the context module 236 can recognize pinpoint information that may indicate a scheduled activity associated with the first pattern to override a trigger that falsely identifies a transition to the second pattern. In this example, a user may be detected as leaving their desk (e.g., a trigger indicating the second pattern), but their calendar system (e.g., pinpoint information) may indicate they are headed to a meeting (e.g., the first pattern), and therefore not going on break (e.g., not transitioning to the second pattern). In this situation, the context module 236 recognizes data associated with the first pattern that is inconsistent with the second pattern, to prevent the activity engine 210 from interrupting the user during the first pattern.

In an example implementation, the context module 236 can include a set of policies to determine whether the information is useful as criteria for overriding a trigger via the machine-learning. The context module 236 can assign a weight to the information based on statistical analysis. For example, the context module 236 may weight a set of factors based on statistically analyzing the user's past behavior patterns. For example, where a person is leaving their office space an hour after eating lunch, the calendaring system may indicate that no meetings are scheduled. If the past behavior of the user taking a break when the factors are present in combination, then the context module 236 weights the factors as corresponding to the second pattern. The context module 236 can generate instructions for the activity detector 220 to override triggers.

The model module 239 generates a customized recommendation model for the user that provides redirection (e.g., a recovery plan) to augment the second pattern (e.g., break activity) as described in greater detail below in reference to FIGS. 3-5. In some example implementations, the model module 239 adapts the recommendation model for the second pattern (e.g., break activities) based on the first pattern (e.g., work activities). In an example implementation, the model module 239 can generate the customized recommendation model employing the context module 236.

For example, the context module 236 can provide instructions for the model module 239 to set recommendations based on the schedule information (e.g., a duration for performing a recovery plan that will not conflict with a meeting schedule for the future). Additionally, context module 236 may cause the model module 239 to enable or disable types of recommendations. For example, the context module 236 can enable the model module 239 to include recommendations (e.g., walk to patio) based on environment data 208 (e.g., patio location, whether forecast, etc.). In another example, the context module 236 can disable the model module 239 from including recommendations (e.g., walk to cafeteria) based on pinpoint data 207 (e.g., diner reservations) and/or sensed data 206 (e.g., eating behaviors, etc.).

The model module 239 uses the data associated with at least the first pattern (e.g., sensed data 206, pinpoint data 207, environment data 208) to generate the customized recommendation model. For example, when the activity detector 220 detect that the first pattern (e.g., work activities) includes sitting and not moving, a resting heart rate, etc., the model module 239 adapts the recommendation to redirect the user during the second pattern (e.g., break activities) to perform an active recovery plan, for example, suggesting activities that either directly or indirectly result in the user walking a certain number of steps, an activity the elevates the user's heart rate to a desired level, etc. In another example, when the activity detector 220 detects that the first pattern (e.g., work activities) includes data indicating the user was physically active (e.g., sensed via a wearable device, camera, location tracking, etc.) the model module 239 adapts the recommendation to redirect the user during the second pattern (e.g., break activities) to perform a restful recovery plan, for example, suggesting activities that either directly or indirectly result in stretching, mental stimuli, etc. In another example, when the activity detector 220 detects that the first pattern (e.g., work activities) includes sensed data indicating the user was engaged in mentally demanding activity (e.g., sensed based on pupil dilation) the model module 239 adapts the recommendation to redirect the user during the second pattern (e.g., break activities) to perform a low cognitive recovery plan, for example, a simple game.

The model module 239 learns between cycles of the first pattern (e.g., work activities) and the second pattern (e.g., break activities) including second patterns where the user rejects or does not complete the recommendation. The model module 239 generates a model out of the observed correlations that contribute positively for the particular user to iteratively improve the model, and thus improve the recommendations.

The feedback module 240 is configured to provide evaluation information back to the DSS 230 for refining and improving the DSS 230 functionality. For example, a user rejecting the recommendation and then performing the first pattern can be used to refine the patterns to reduce false positives (e.g., providing a recommendation when the user is engaged in the first pattern) by the activity detected 220. The DSS 230 learns the trigger in view of the context factor is inconsistent with a transition to the second pattern. The feedback module 240 can also gather feedback information that indicates the effectiveness of the redirection compared to collected data when the recommendation is not accepted during the second pattern.

The model module 239 can further customize the recommendation model by observing correlations in data gathered by the feedback module 240. In an example implementation, the model module 239 uses monitored data during the second pattern (e.g., a break) the correlates positively with performance measured after transitioning back the first pattern. That is, model module 239 promotes recovery activities based on monitored data from previous cycles of the second pattern. In some cases, when the recommendation was not accepted (e.g., the user does not preform the recovery plan during a break), positive performance measured after transitioning to first pattern can be used to improve the next recommendation by updating the model to include new recovery activities.

In an example implementation, when the user activity level changes from the first pattern to the second pattern and then returns back to the first pattern (e.g., work, break, work), the productivity measurement of the cycle can be compared to a previous cycle (e.g., the first pattern and the return to the first pattern), and then the feedback module 240 can evaluate the factors applied in each cycle's recommendation output. For example, the feedback module 240 can evaluate the effectiveness of the recommendation (e.g., a recovery plan) by comparing data (e.g., the heart rate during the break) between subsequent cycles (e.g., a break performed by the user who rejects the recommendation and a subsequent break performed by the user who accepts the recommendation).

In an example implementation, the feedback module 240 compares levels of performance between the first pattern and second pattern. In an example implementation, the feedback module 240 observes levels of sensed data 206 (e.g., heart rate, perspiration) during a break. This feedback can be used by the DSS 230 to adapt the recommended recovery plan. For example, based on feedback from feedback module 240, the activity engine 210 can determine that a desired increase in heart rate was not reached, and the system may adapt the recovery plan to include a more physically exerting recovery activity (e.g., redirection).

A recovery activity application (e.g., a client service), such as a mobile application running on a smartphone 205, can be used to interact with the activity engine 210 to provide an input and receive the output from the activity engine 210. The recovery activity application can interact with the activity engine 210 directly or indirectly, such as via a network. In an example implementation, the recovery activity application receives instructions to redirect the second pattern based on the recommendation without interrupting the first pattern. For example, the recovery activity application can execute the output of the activity engine 210 that directs the user to perform a recovery plan as described in greater detail below in reference to FIGS. 6a-6b and 7a-7b.

Figure 3:
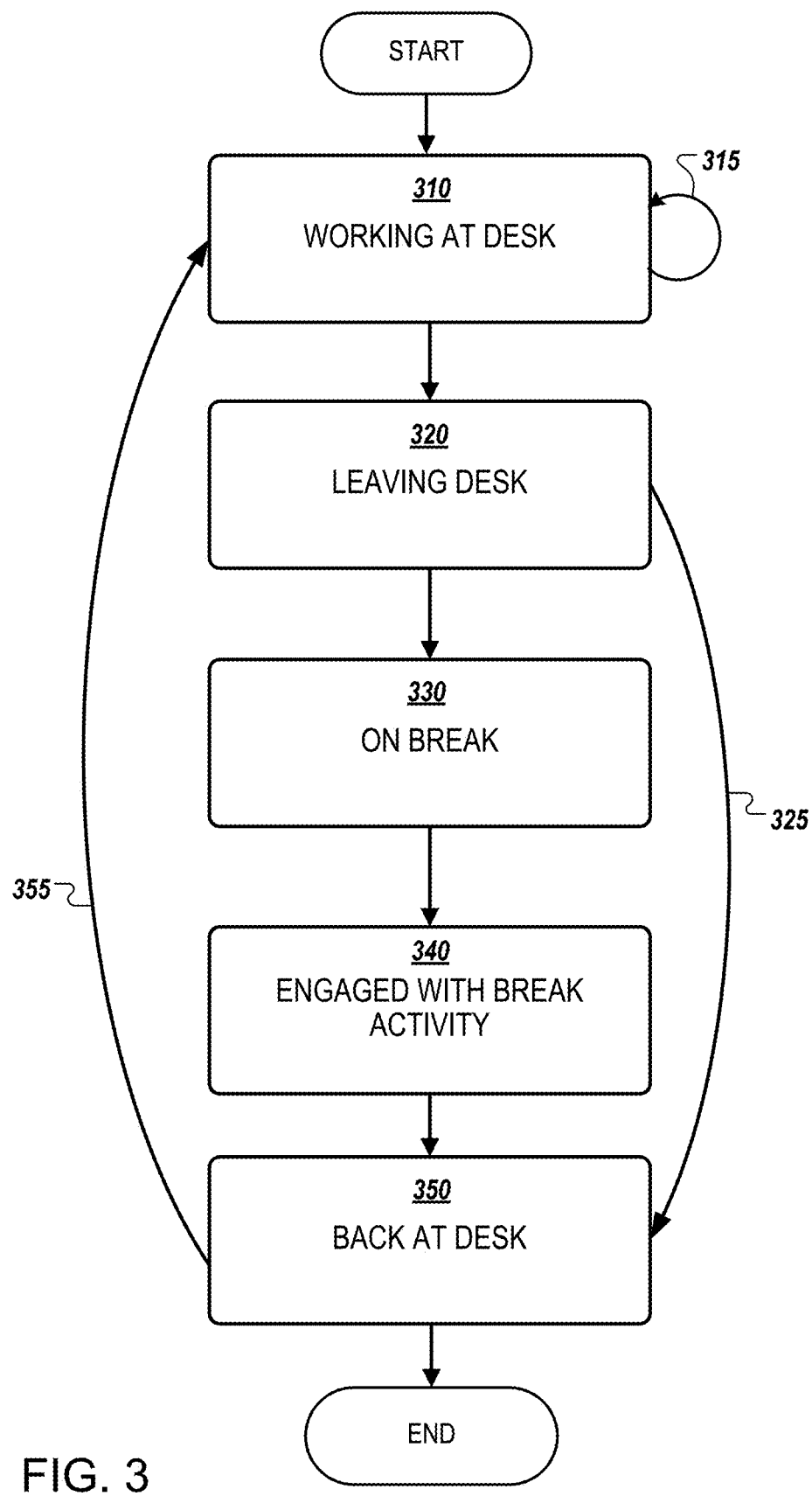
FIG. 3 illustrates an example user sequence in accordance with an example implementation.

FIG. 3 illustrates an example user sequence in accordance with an example implementation. In an example cycle, a person may be working at their desk 310 performing work activities and leave their desk 320 to go on break 330, engage with break activity 340, then return to working back at the desk 350. In an example implementation, information associated with a user's work activities and break activities are gathered and analyzed to identify a first pattern associated performing work activities and a second pattern associated with break activities.

Further, the example implementation detects a trigger indicating a transition to the second pattern, such as the user leaving their desk 320 indicating that the user is going on break. However, the trigger simply indicates the transition to second pattern and may not be sufficient to verify the transition has occurred. The detected trigger causes the activity engine 210 to further determine the user's state (e.g., the first pattern or the second pattern) based on additional information, such as other sensed data 206, pinpoint data 207, environment data 208, etc. For example, the trigger may be a false positive since some behaviors may be associated with both the first pattern and second pattern.

For example, if the user leaves their desk 320 (e.g., a trigger indicating the second pattern) to go to a meeting or perform work activities at another location (e.g., the first pattern), additional parameters associated with the first pattern and the second pattern can provide context to the user's state. Accordingly, context factors are combined to assess whether the user is performing activities associated with the first pattern (e.g., work activities) or activities associated with the second pattern (e.g., break activities). In the example, detecting a user leaving their desk 320 may be associated with both the second pattern (e.g., on break 330) and the first pattern (e.g., working away from their desk 325). In an example implementation, the triggers and context factors are be assigned weights based on the analysis of the information to identify the first pattern and second pattern.

Through repetitive machine-learning, the activity engine 210 is able to iteratively improve identifying triggers that indicate a transition from the first pattern to the second pattern and recognizing context factors associated with the first pattern that are inconsistent with the second pattern. Accordingly, if the user switches (e.g., leaving desk 320) from working at a desk 310 to working in a conference room 325 to working in a cafeteria 325, before returning to working back at their desk 350, the trigger of leaving desk 320 is detected and the activity engine 210 may learn context factors (e.g., time of day, a meeting schedule, conference room location, presence of a supervisor, history of working in certain locations, etc.) that are inconsistent with the second pattern (e.g., engaged with break activity 340).

To verify whether the user has transitioned to the second pattern (e.g., engaged with break activities 340), the activity engine 210 can calculate a threshold using the machine learning. In an example implementation, the activity engine 210 weights the triggers and context factors to determine whether the trigger in view of the context factors satisfy the threshold. In response to verifying the trigger in view of the context factors indicate a transition to the second pattern (e.g., a recommendation event), the activity engine 210 provides redirection to the user.

In response to determining the trigger in view of the context factors do not satisfy the threshold, the activity engine 210 can monitor the user activity for other triggers, as described below in reference to FIGS. 4-5 and 8. In some example implementations, the context factors can override the trigger. For example, when inspection of the context factors in view of the trigger indicates activities inconsistent with the second pattern the transition to the second pattern is not verified. For example, the activity engine 210 can determine that activities are inconsistent with the second pattern by assessing if the weighted context factors and detected triggers do not satisfy a threshold. Accordingly, the sequence of 320, 325, 350 is a non-recommendation event and the activity engine 210 avoids interrupting the productivity of the user working away from their desk.

Once the activity engine 210 verifies the trigger and context factors are associated with a transition the second pattern (e.g., a break period), the recommendation is provided to redirect the user to perform the recovery plan.

Figure 4:
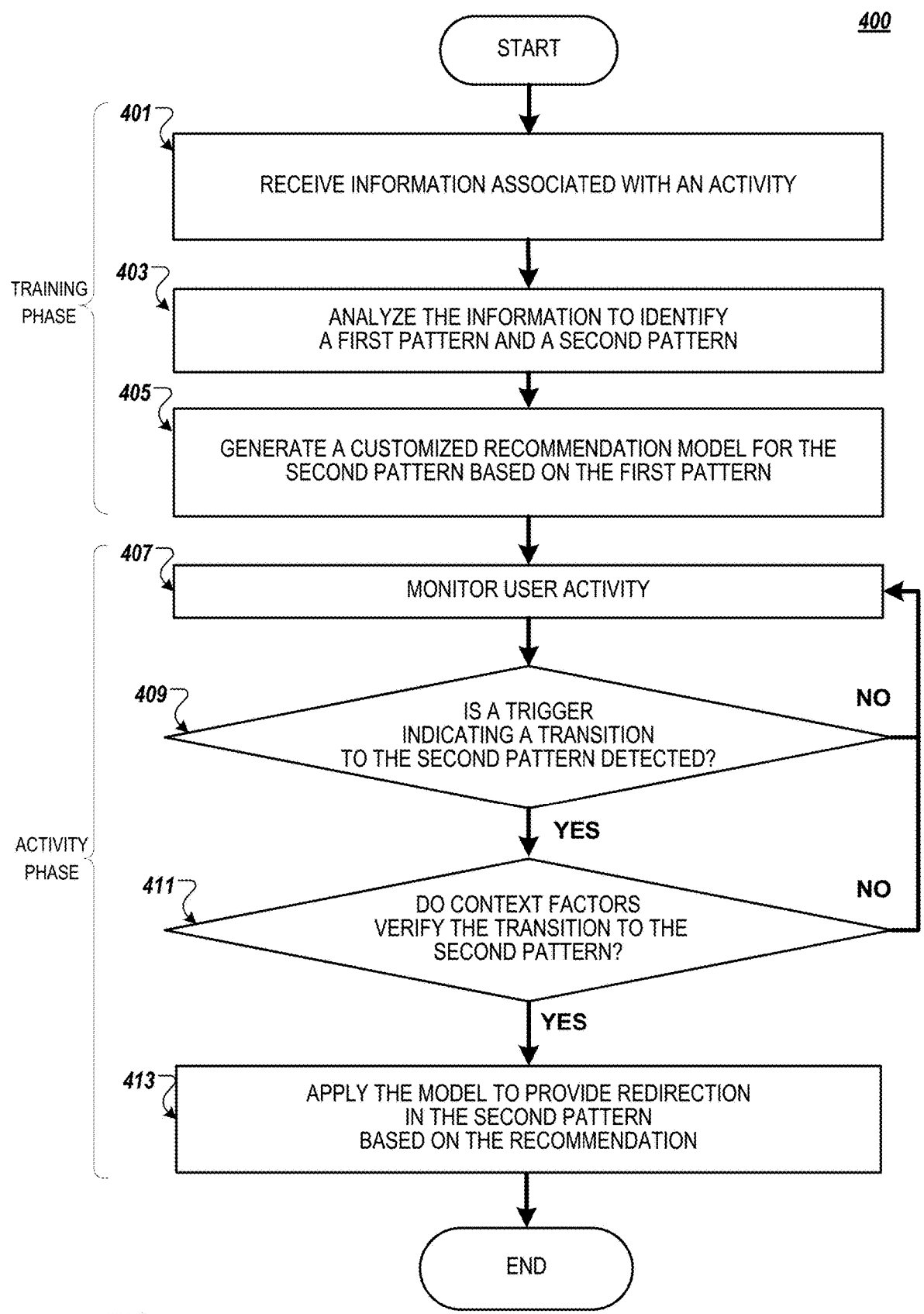
FIG. 4 illustrates a server flow diagram for a customized model in accordance with an example implementation.

FIG. 4 illustrates a server flow diagram of method 400 for a customized model in accordance with an example implementation. The method 400 is performed by processing logic that may comprise hardware (circuitry, dedicated logic, etc.), software (such as operates on a general purpose computer system or a dedicated machine), or a combination of both. Method 400 may be performed by the activity engine 110 of FIG. 1. Though method 400 is described below as being performed by an activity engine, method 400 may also be performed by other processing logic.

At 401, the processing device receives information associated with an activity. In an example implementation, the information can be gathered by client services that include sensed data 206, pinpoint data 207, environment data 208. Information associated with the user can be provided from multiple client services in parallel. Client services can include any number of resources for collecting data, such as, cloud services, data repositories, scheduling applications, building control systems, mobile devices, smartphones, health tracking sensors, cameras, etc.

At 403, the processing device analyzes the information to identify a first pattern and a second pattern. In an example implementation, the first pattern and second pattern may be indicated by sensing changes in the user's physiological data, such as, body position, location, heart rate, sugar levels, blood pressure, eye gaze, vocal activity, body temperature, etc. For example, a camera may monitor when a user changes positions or leaves a workstation, or whether there are any visitors at the workstation. The user's patterns may also be indicated by interpreting pinpoint data that indicates changes in activity. For example, the user's patterns may be indicated by computer activity, noise levels, social interactions, scheduled activities, peripheral device usage, etc.

The user's patterns may further be indicated via environment data such as lighting system activity or internal or external building temperatures. For instance, the processing device can analyze location data to determine that the user has moved away from a designated workstation based on the sensed data associated the user. In another example, the processing device may correlate a user's second pattern (e.g., going on break) with activation of a heating or air-condition system and use the environment data as a factor with other data to identify a trigger (or series of triggers) that indicates the user is transitioning to the second pattern. In example implementations, the processing device uses training data to correlate received information with the first pattern and the second pattern. In an example training data set, the user may be prompted to label time periods to categorize information with the first pattern and/or the second pattern.

In an example implementation, the processing device analyzes the information to identify triggers that differentiate the user's activity during the first pattern and the second pattern. For example, sensed behavior, such as changes in the user's body position, location, heart rate, sugar levels, adrenaline, blood pressure, eye gaze, etc., can be analyzed to determine if the trigger correlates exclusively with one of the first pattern or second pattern. However, as described above, context factors are recognized that can verify the transition.

At 405, the processing device generates a customized recommendation model for the second pattern based on the first pattern. The customized recommendation model can include instructions to recommend a recovery activity based on the information and the first pattern. The customized model is generated using one or more of machine-learning techniques associated with a set of training data, user preferences, environmental controls, clinical guidelines, safety regulations, and social graphs.

In an example implementation, the processing device can generate the customized recommendation model based on a hierarchical library of models. The processing device can select from the hierarchical library of models based on different data (e.g., sensor data, pinpoint, etc.). For example, the customized recommendation model can include different models for different times of day (e.g., a different model for the morning and the afternoon). Each model in the hierarchical library of models can include a different set of recovery activities (e.g., a recovery plan) and be designed based on a first pattern or data. For example, the hierarchical library of models can include a variety of models for different spaces (e.g., for identifying work/break in the office, identifying work/break in the break-room, etc.). The processing device can generate the customized recommendation model by incorporating models from the hierarchical library of models based on the user's patterns. The customized recommendation model can include different model for different work types. For example, the customized recommendation model for a user with a first pattern that includes activities categorized as sedentary (e.g., working at desk) can include sedentary models (e.g., that recommend physical activity) from the hierarchical library of models. For example, the customized recommendation model for a user with a first pattern that includes activities categorized as physical (e.g., working on a construction site) can include can include physical models (e.g., that recommend sedentary activity) from the hierarchical library of models.

At 407, the processing device monitors the user activity. At 409, the processing device detects a trigger indicating a transition to the second pattern. In some implementations, another processing device can be used, for example, to monitor user activity 407 and detect the trigger at 409, as described above in reference to FIGS. 1-3. In response to detecting a trigger, the processing device proceeds to 411 to assessing context factors to verify the transition to the second pattern without interrupting the first pattern. The processing device passively provides the recommendation to the user without interrupting the user's first pattern (e.g., work activities) to impact (e.g., improve) the user's readiness to return to the first pattern (e.g., work activities). If a trigger is not detected at 409 or if the context factors override the trigger, the processing device can return to 407 to continue monitoring user activity for a transition. It should be noted that the processing device continues to monitor user activities independent of block 407, such as to gather user information, feedback, performance, etc.

At 413, the processing device applies the customized recommendation model to provide redirection in the second pattern based on the recommendation. The redirection can be a recovery plan that can include one or more of mental stimuli, physical stimuli, or social stimuli. For example, the recovery plan may include displaying an electronic game that directs the user to a location within a workplace setting. The customized recommendation model can be dynamically applied based on real-time data, as described in greater detail above in reference to FIG. 2. For example, the recovery plan can direct the user to walk to different locations at the office based on the user's social graph, personalize the duration based on the next meeting in the schedule or a sensed heart rate threshold, etc.

In example implementations, the processing device receives feedback information associated with the second pattern. The processing device can further update the model based on received feedback information. The machine-learning process iteratively improves pattern detection, context factor analysis, and recovery plan recommendations. The feedback information can indicate the user's acceptance of the recommendation to perform a recovery plan, recorded feedback during performance of the first pattern (e.g., a user's productivity after returning to work activities) and/or second pattern (e.g., sensed data during a regular break activities and/or recovery plan), feedback from the user regarding their satisfaction with the recommendation, etc.

For example, feedback information can include the duration for transitioning back to the first pattern, tracking co-presence of another user, user location data, user survey, and post-break activity. In an example implementation, the processing device uses feedback based on sensor data (e.g., number of steps taken) to customize the recommendation model with a particular recovery activity (e.g., adapt the recovery plan to be longer, shorter, more or less exerting). If a user repeatedly rejects a recommended recovery activity at a particular time, the system may adapt the model to reduce the weight of the recovery activity as recommendation for the user. If the user repeatedly rejects a recommended recovery activity in a particular context, the processing device can update the customized recommendation model to recommend a modified or different recovery plan (e.g., a recovery plan with shorter recovery activities) based on the context.

After the user's transitions back to the first pattern (e.g., work activity), the processing device can continue to track and analyze the user's activity to improve the customized recommendation model. In an example implementation, productivity factors can be identified, measured, and tracked to determine the effectiveness of the recommendations. For example, if the first pattern has measurable goals during a work period, such as to move fifty boxes, the productivity across multiple first patterns (e.g., work periods) can refine the customized recommendation model to reach the goals more effectively. The user can also provide feedback to indicate the recommendation's impact on the readiness to return to the first pattern. For example, the user can adjust preferences, complete a satisfaction survey, etc. Accordingly, feedback into the recommendation model customized the model to provide more effective recommendations of recovery activities (e.g., redirected break activities) that prepare the user to return to the first pattern (e.g., work activities).

In some example implementations, method 400 may be implemented with different, fewer, or more blocks. In an example implementation, blocks 401-405 may be implemented independently from blocks 407-413. For example, blocks 401-405 can be implemented as part of a training phase by a device to generate a model, and blocks 407-413 can be implemented as part of an activity phase by another device repeatedly to apply the model. In some example implementations, the process can periodically return to one of blocks 401-405 to incorporate feedback and update the model as described in greater detail in reference to FIGS. 2 and 8. Method 400 may be implemented as computer executable instructions, which can be stored on a medium, loaded onto one or more processors of one or more computing devices, and executed as a computer-implemented method.

Figure 5:
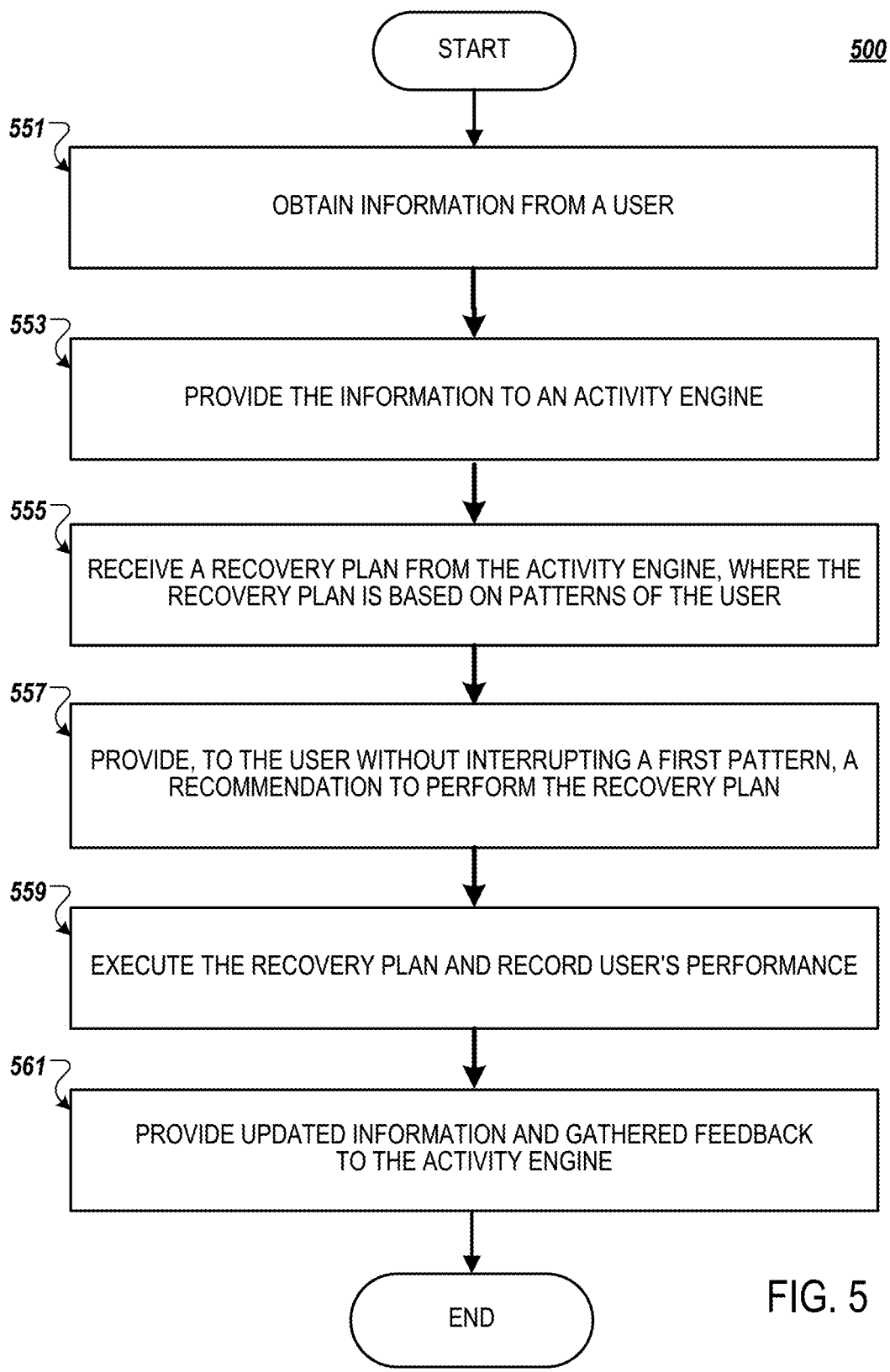
FIG. 5 illustrates a client flow diagram for a customized model in accordance with an example implementation.

FIG. 5 illustrates a client flow diagram of method 500 for a customized model in accordance with an example implementation. The method 500 is performed by processing logic that may comprise hardware (circuitry, dedicated logic, etc.), software (such as is run on a general purpose computer system or a dedicated machine), or a combination of both. Method 500 may be performed by a client service running on a client device 105*a*-105*n* of FIG. 1. Though method 500 is described below as being performed by client service, method 500 may also be performed by other processing logic.

At 551, the client service obtains information from a user. At 553, the client service provides information to an activity engine. At 555, the client service receives a recovery plan from the activity engine, with a recovery plan is based on patterns of user. At 557, the client service provides to the user, without interrupting a first pattern (e.g., work activities), a recommendation to perform the recovery plan. At 559, client service may execute the recovery plan with the user and record the user's performance. At 561, the client service gathers feedback and provides updated information to the activity engine.

Figure 6A:
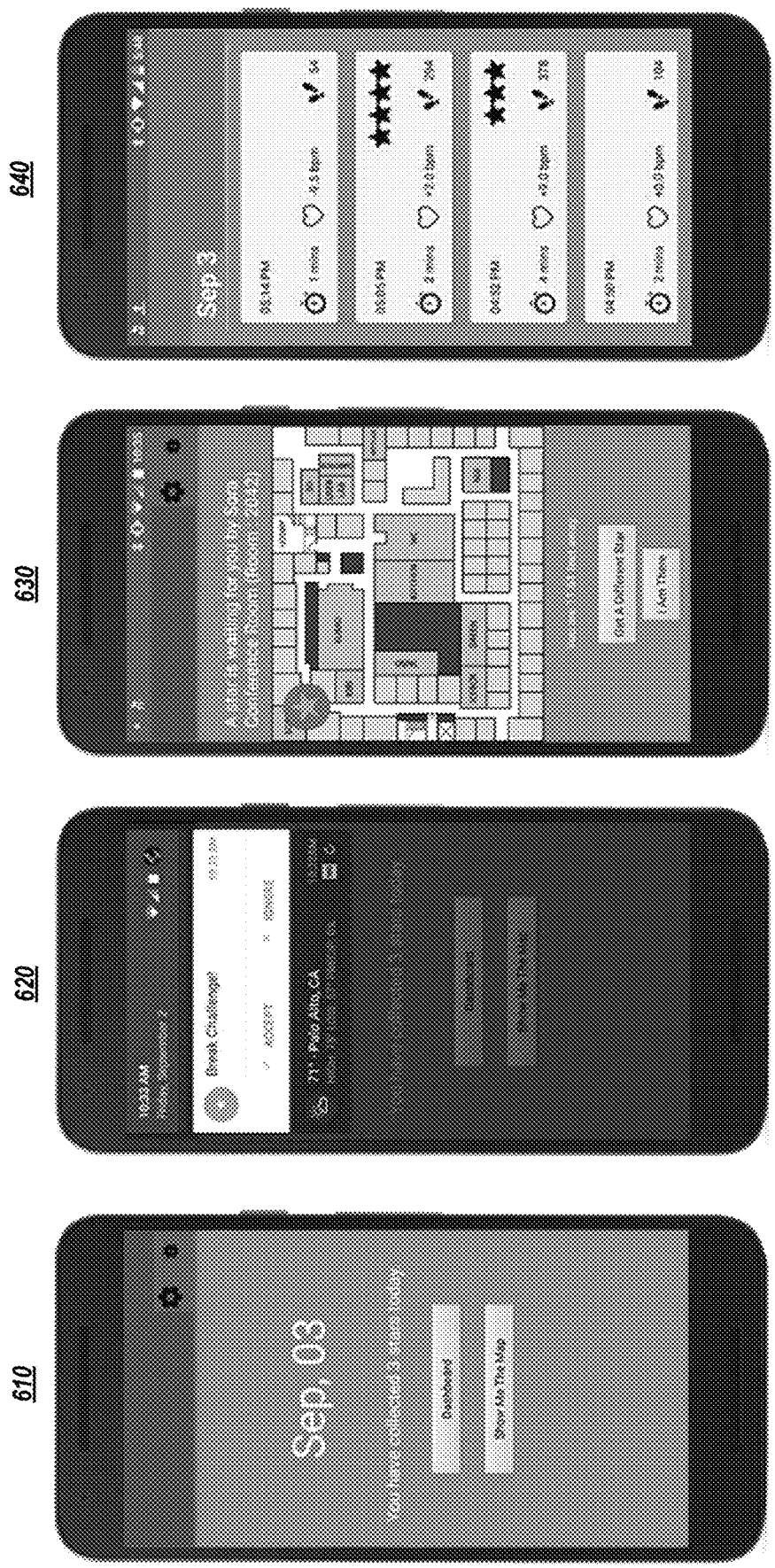
FIGS. 6a and 6b illustrate example interfaces for an example recovery plan in accordance with an example implementation.
Figure 6B:
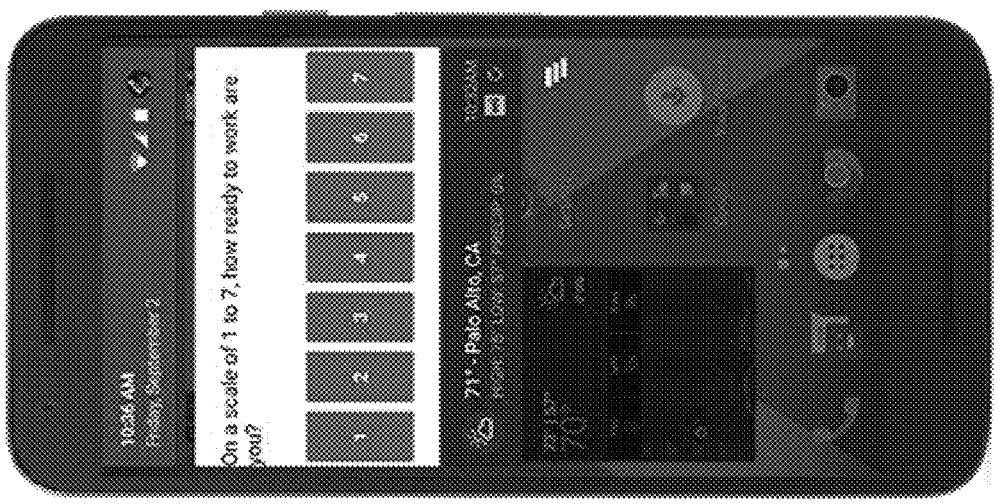
Figure 6B:
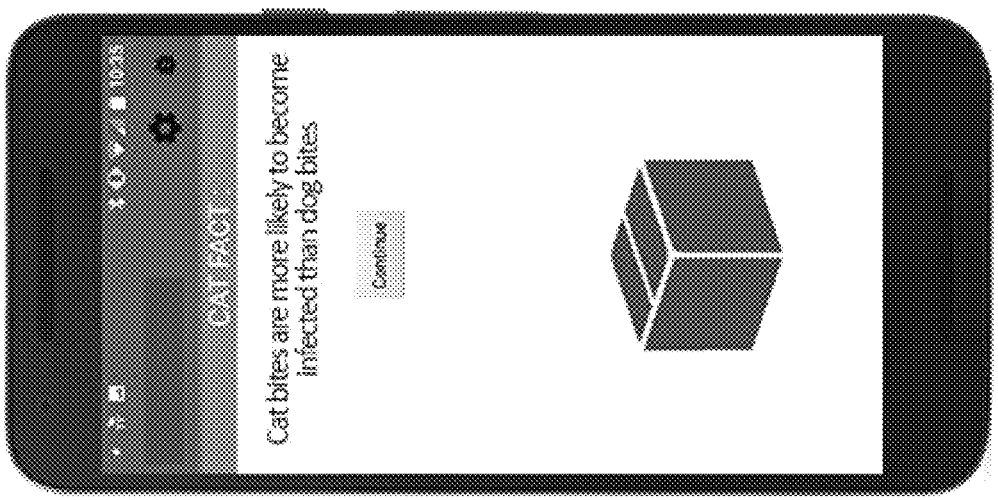
Figure 6B:
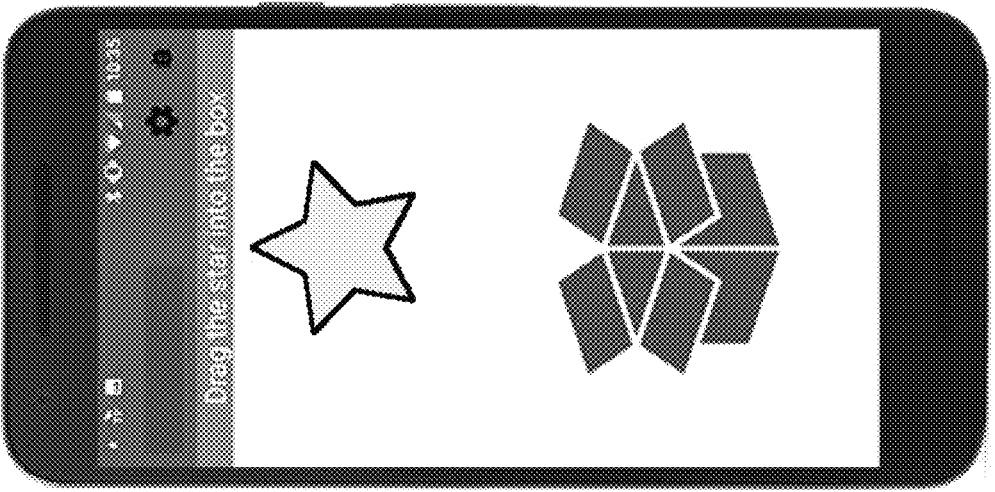

FIGS. 6*a* and 6*b* illustrate an example interfaces for an example recovery plan in accordance with an example implementation. A recovery activity application, such as a mobile application running on a smartphone, can be used by the user to execute the recovery plan. The mobile device can provide an example home interface 610 of the recovery activity application. The home interface 610 can display the user's achievements from previous recovery plans, allow the user to program and modify preferences, as well as perform the recovery plan. The recommendation interface 620 of the recovery activity application illustrates a suggested recommendation from the activity engine such as block 557 of FIG. 5.

In an example implementation, the user is located in their office and is stationary. The system monitors the user's location and looks for any change to a moving state. The system can also records the user's heart rate to compute a pre-break resting-state heart rate. When the system determines that the user is not stationary and has moved away from their desk, the user receives a vibration notification on their phone that a recovery activity is available at 620. The user can either tap "Accept", or can either explicitly dismiss the challenge (by tapping "Ignore") or simply do nothing to ignore. The interaction is offered when the user is already moving or is away from their desk, thus avoiding interrupting their work (i.e. the first pattern). Furthermore, since the user may not be on a break (e.g., they are going to a meeting), or if they cannot or do not wish to engage with the application, they can easily dismiss the recommendation (e.g., a notification on the mobile device).

Recovery plan interface 630 illustrates an example recovery plan for the user to perform. In this example implementation, the recovery plan provides locations around the office for the user to collect virtual stars. The recovery plan interface 630 depicts a layout of a work environment of the user.

In an example implementation, if the user accepts the recommendation to perform a recovery plan, the application displays a map of the work environment on the mobile device, and a target location to go to. A label at the top of the screen provides a location name. As the user moves nearer to the target, the appearance of the target on the map changes (e.g., grows). When the user is sufficiently close to the target, the appearance of the target on the map changes (e.g., changes to a large star) and the mobile device vibrates. A feature to "Get a Different Star" allows a user to request a target at a different location. A feature "I am There" allows a user to indicate that the user is at the target location, for example, in case the user is incorrectly localized by the system.

The activity engine determines a personalized recovery plan that is customized for the user based on the selected models modified by the user's storable patterns, adjusted for the user's recent activity levels, and tailored to satisfy personal preferences and context factors. For example, the personalized recovery plan may have a set number of stars for a user to collect during a break based on the user's previous recovery plan performances, selectively choose the location where the user is to collect each star based on the user's social graph or location history, and tailor the recovery plan so that the user returns to work activities ready to work.

The dashboard interface 640 of the recovery activity application can provide the user with information regarding their patterns, behaviors, and performances during the recovery plan. For example, when the user returns to their desk and resumes a stationary state (e.g., the first pattern), the mobile device can vibrate and display a dashboard interface 640. The dashboard interface 640 can summarize the user's time away from their desk (e.g., the second pattern). Dashboard information can include, for example, the duration of the recovery activity, the number of stars collected, the number of steps walked, and the difference between the user's recorded heart rate during the second pattern (e.g., break activities) and the first pattern (e.g., pre-break or post-break activities) resting-state heart rate. Feedback interface 670 receives input from the user to gather feedback, such a user satisfaction. The user feedback is fed back to the activity engine to improve the user's customized recommendation model for the next transition to the second pattern (e.g., recovery period).

Interfaces 650 and 660 depict example user interactions for performing the recovery plan. For example, when sufficiently close to the target location, the target may be displayed as a star on the map. After the star appears, the user taps anywhere on the map and "collects" the star by dragging the star into the box and the application presents the user with media content, such as a random "fact", trivia question, or video.

Figure 7A:
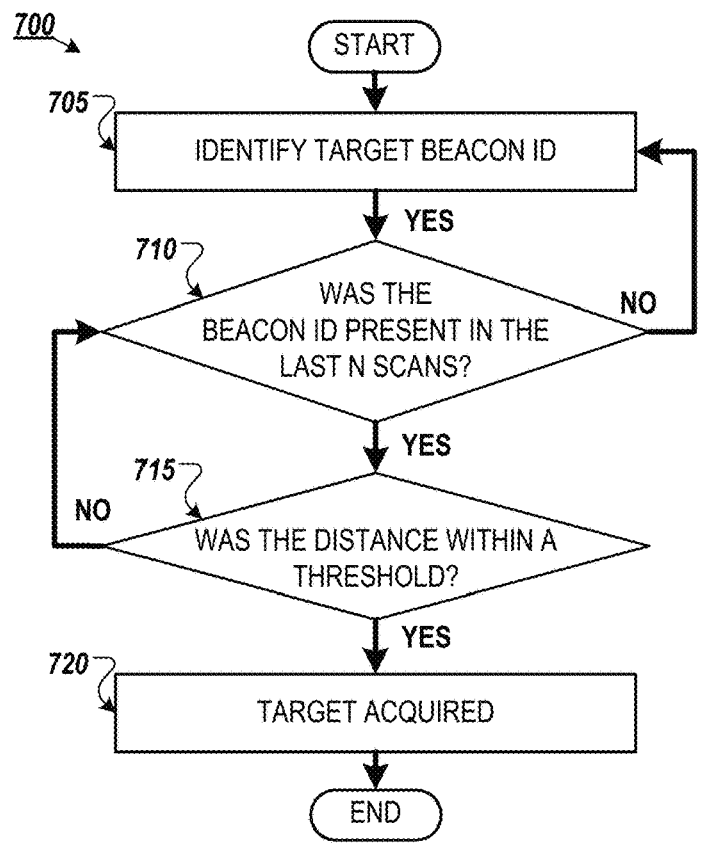
FIGS. 7a and 7b illustrate beacon processing associated with an example recovery plan in accordance with an example implementation.
Figure 7B:
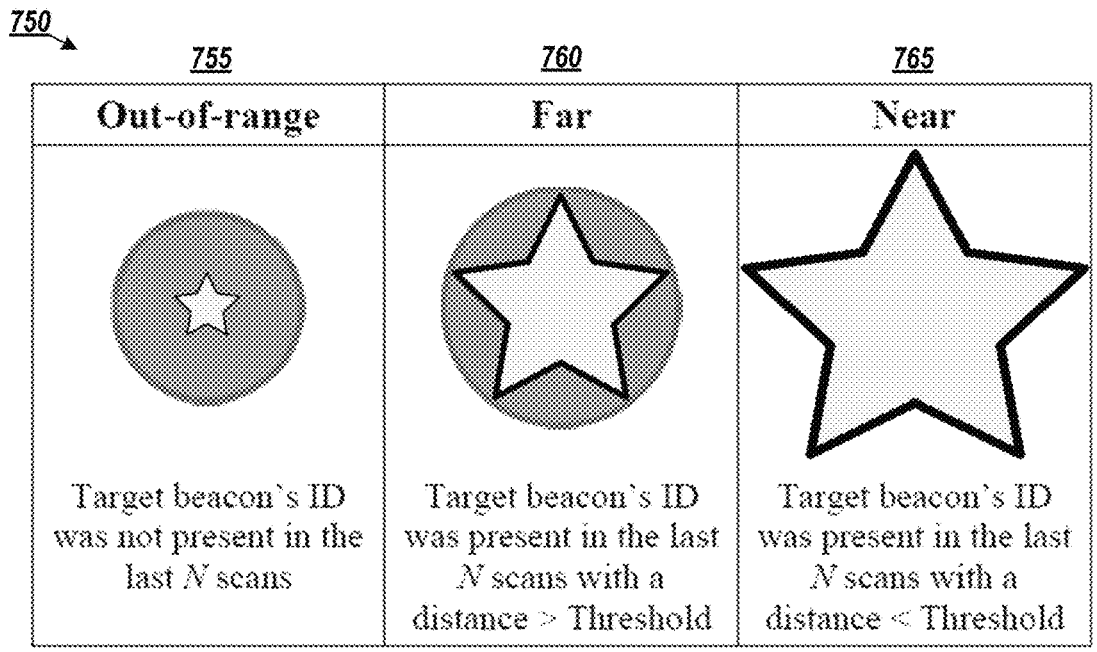

FIGS. 7a and 7b illustrate beacon processing associated with an example recovery plan in accordance with an example implementation. For indoor environments, additional location tracking services may aid in detecting user activity. Walls generally limit transmitting signals and therefore inhibit the implementation of certain recovery activities directed by a mobile device indoors. In some implementations, the user can carry or wear a device (e.g., client devices 105a-105b of FIG. 1, FIGS. 6a-6b) to track and/or guide the user during the first pattern (e.g., work activity) and the second pattern (e.g., recovery plan). Additionally, some environments may include client services integrated into the infrastructure (e.g., client devices 105a-105d of FIG. 1, camera systems, tracking systems, smart building sensor systems, etc.) that can track and/or guide a user during a first pattern and a second pattern.

In an example implementation, an office can be outfitted with beacons identifying spaces. The beacons can be used to assign a work location for a user, identify break locations, as well as specify off limits locations. For example, Wifi or Bluetooth low energy devices (BLE) that use a standardized protocol for broadcasting an identifier to nearby portable devices scanning frequencies can be used. The identifier can then be used to identify the context of the user (e.g., the mobile device) and trigger a corresponding action. For example, a recovery plan involving a scavenger hunt that takes a user to different locations in the office can use beacons to direct the user around the office to collect virtual stars or rewards using the mobile device or integrated client services.

The environment can include home beacons and target beacons. The recovery activity application, such as a mobile application running on a smartphone, can include a mapping of beacon identifiers using room names. Environment data can be used to gather a building layout and office directory to populate different environments. Additionally, the user can configure the application to scan for a "home" beacon which corresponds with a room where the user's workspace is located. A threshold on the reported distance from the home beacon can be used to determine whether the user is at or away from their desk. For each user, other beacons in the environment are potential "target" beacons.

Certain environments may not be well-suited for performing recommended recovery activities. For example, it may not be desirable to perform a recovery plan (e.g., redirection of the second pattern) in certain locations if the space is being used by coworkers or is generally off-limits, such as a coworker's office. Since beacons may reside in spaces that may not be accessible or desirable to access, threshold distances from the beacons can be used for determining that a target is within range to allow the user the option of completing the recovery activity without entering the location of the target beacon.

In an example implementation, a sliding window technique for beacon detection can be used to address issues of intermittent beacon observation by the recovery activity application and high variance in distance accuracy in indoor environments. In an example implementation, as illustrated in process 700 of FIG. 7a, a device (e.g., a communication sensor or processing device of a mobile device) can identify target beacon identifiers at 705. At 710, the device determines whether the beacon identifier was present in the last N scans. For example an array, or window, of size N that represents the N most recent scans for a particular Bluetooth beacon is used to sense the particular beacon. If a scan does not contain an observation of that particular beacon, then a null value is used as a placeholder in the window. The recovery activity application running on the device can maintain multiple windows, for example, one representing recent scans for the user's home beacon and another for the current target beacon. If the beacon identifier was not present in the last N scans, the device can return to 705 to search for the target beacon identifier or select a new beacon identifier to search.

In response to determining the beacon identifier was present in the last N scans, the process can continue to 715 to determine whether the distance is within a threshold. At 720, in response to determine the distance is within the threshold, the target is considered acquired.

As further illustrated in FIG. 7b, states in relation to a target beacon can be described as:

if all values from a beacon's window are null, the user is considered "Out-of-range" from that beacon;

if there is at least one non-null value in a beacon's window, then the average of these values is compared to its respective threshold;

if the distance returned by the window is greater than the threshold, then the beacon is considered "Far", and otherwise it is considered "Near".

Accordingly, the location sensing is tailored for performing the recovery activity (e.g., redirection of the break activities) to accommodate different environments and improve performance of the recovery activity application. The recovery activity application collects feedback data that can include logging beacon distance data along with sensed data for updating the model as described in greater detail above in reference to FIGS. 2-5.

Figure 8:
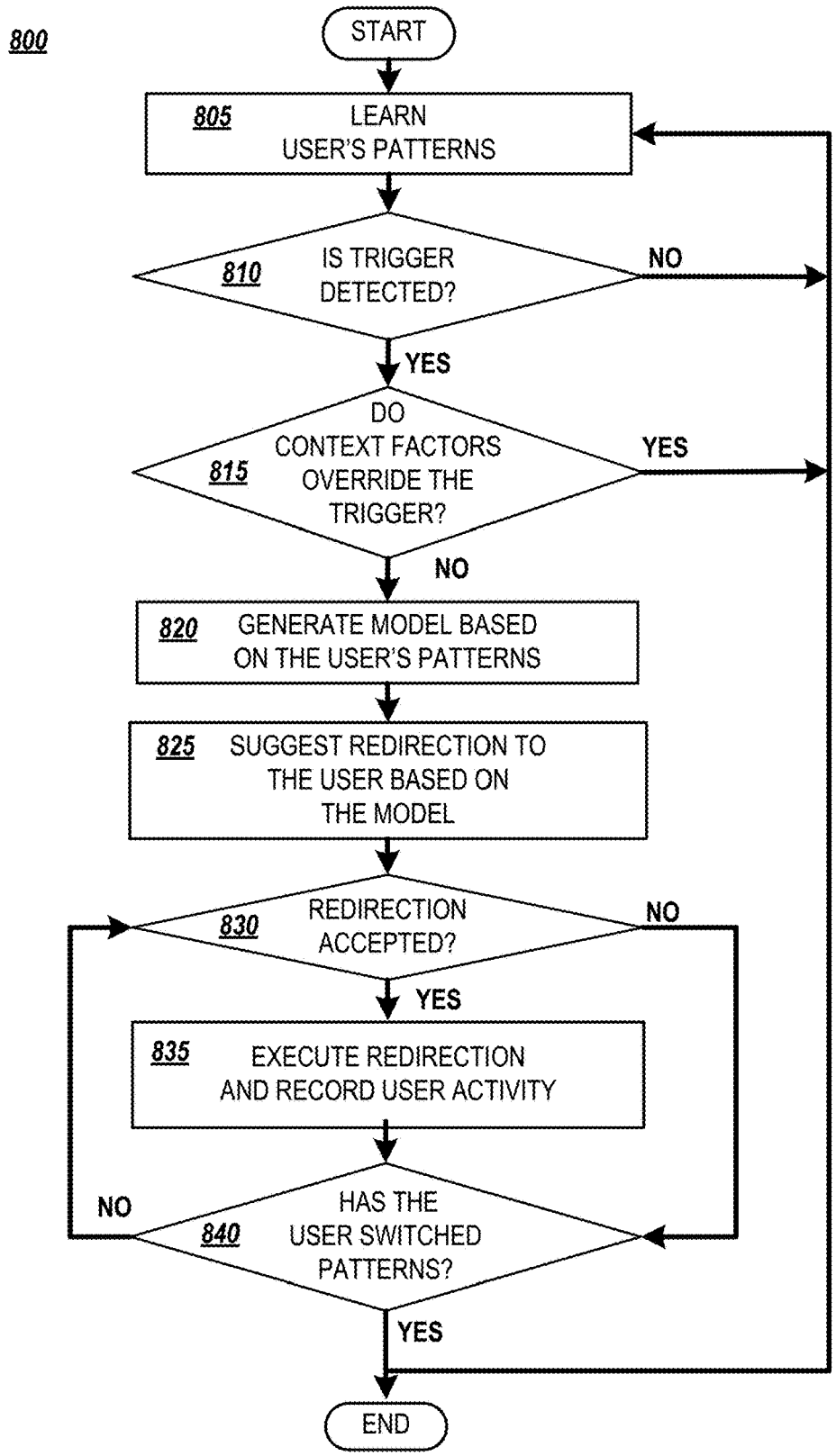
FIG. 8 illustrates a flow diagram for executing a customized model in accordance with an example implementation.

FIG. 8 illustrates a flow diagram for executing a customized model in accordance with an example implementation. In some example implementations, process 800 may be implemented with different, fewer, or more blocks. As discussed above in reference to FIG. 4, example implementations can include training phases and activity phases. In an example implementation, blocks 805 and 820 may be implemented in sequence with blocks 810, 815, 825-840. Process 800 may be implemented as computer executable instructions, which can be stored on a medium, loaded onto one or more processors of one or more computing devices (e.g., system 200 of FIG. 2), and executed as a computer-implemented method.

At 805, the system learns a user's patterns. In an example implementation, the system uses machine-learning to identify a first pattern and second pattern of the user based on received information associated with an activity. In example implementations, the system can actively monitor the information associated with the user activities in real time, based on a timed interval, or hierarchy of triggering factors. Real-time monitoring can be implemented by, for example, a camera system. Additionally, timed intervals may be static and preprogrammed to check a user's activity (e.g., to detect a change in the level of the activity) every so many number of seconds minutes or hours.

A dynamic time interval may gradually be adjusted to change the interval between checking the information associated with the user's activity. In an example implementation, the system checks for information based on a countdown interval in view of the patterns. For example, if a user routinely transitions from the first pattern to the second pattern (e.g., takes breaks) every 3 to 4 hours, then the system can decrease the interval between checking for information as the time since the previous transition to the first pattern (e.g., end of a break) increases towards the observed 3 to 4 hour interval.

At 810, the system detects a trigger indicating a transition to the second pattern, as discussed above in reference to FIGS. 2-5. Additionally, a hierarchy of triggering factors may be used to detect a transition and/or adjust the interval for checking for information. In an example implementation, the system may sense a behavior indicating in the transition to the second pattern (e.g., a behavior indicating a break is forthcoming). For example, the system may detect a yawn and then decrease the interval between checking the user's eye gaze. In another example, if a user is observed frequently going on a break after receiving a phone call from a particular contact, then the system can increase checking for information after detecting a phone call from that contact. The one or more observed behaviors may be detected as a trigger indicating the user is transitioning to the second pattern (e.g., ready to go on break) or may be overridden by assessing context factors.

In response to the trigger indicating a transition to the second pattern, at 815 the system inspects context factors to determine whether to verify or override the trigger. For example, if the context factors indicate that the user activity is inconsistent with the second pattern, the system can override the trigger and return to 805 to update learning the user's patterns. Accordingly, the system avoids interrupting the user during the first pattern (e.g., work activity) to increase the net productivity gained by transitioning to the second pattern (e.g., taking the break). If the context factors indicate the user activity is consistent with the second pattern, the system can verify the trigger and proceed to 820.

At 820, the system generates a customized recommendation model based on the user's patterns. At 825, the system suggests redirection to the user based on the model. As discussed above in reference to FIGS. 2-5, example implementations for generating the customized recommendation model can include training data, context factors, a hierarchical library of models, etc. Further, the suggested redirection can incorporate context factors, feedback information, machine-learning, etc. for suggesting different redirections to the second pattern (e.g., a recovery plan) based the first pattern (e.g., type of work activity, sensed data, environment, context factors, etc.).

At 830, the system determines whether redirection is accepted by the user. In response to the user accepting redirection, at 835 the user can execute the redirection and the system employs services (e.g., client services) to track and record user activity. Whether redirection is accepted or rejected by the user, the system can track and monitor the user activity during the second pattern (e.g., break activity) to improve pattern learning and customization of the recommendation. Accordingly, the user's productivity may be improved by suppressing recommendations unless the transitions to the second pattern is verified through the pattern recognition processes, as well as by iteratively improving suggestions to redirect the second activity that enhance the user's recovery before returning to the first pattern.

At 840, the system can monitor for the user switching back to the first pattern. If the user has not switched to the first pattern, the system can return to 830 to monitor the user during the second pattern regardless if the redirection has been accepted. In response to determining the user has transitioned to the first pattern, the system can return to 805 to feed the user's behaviors back to learn and update the user's patterns.

Figure 9:
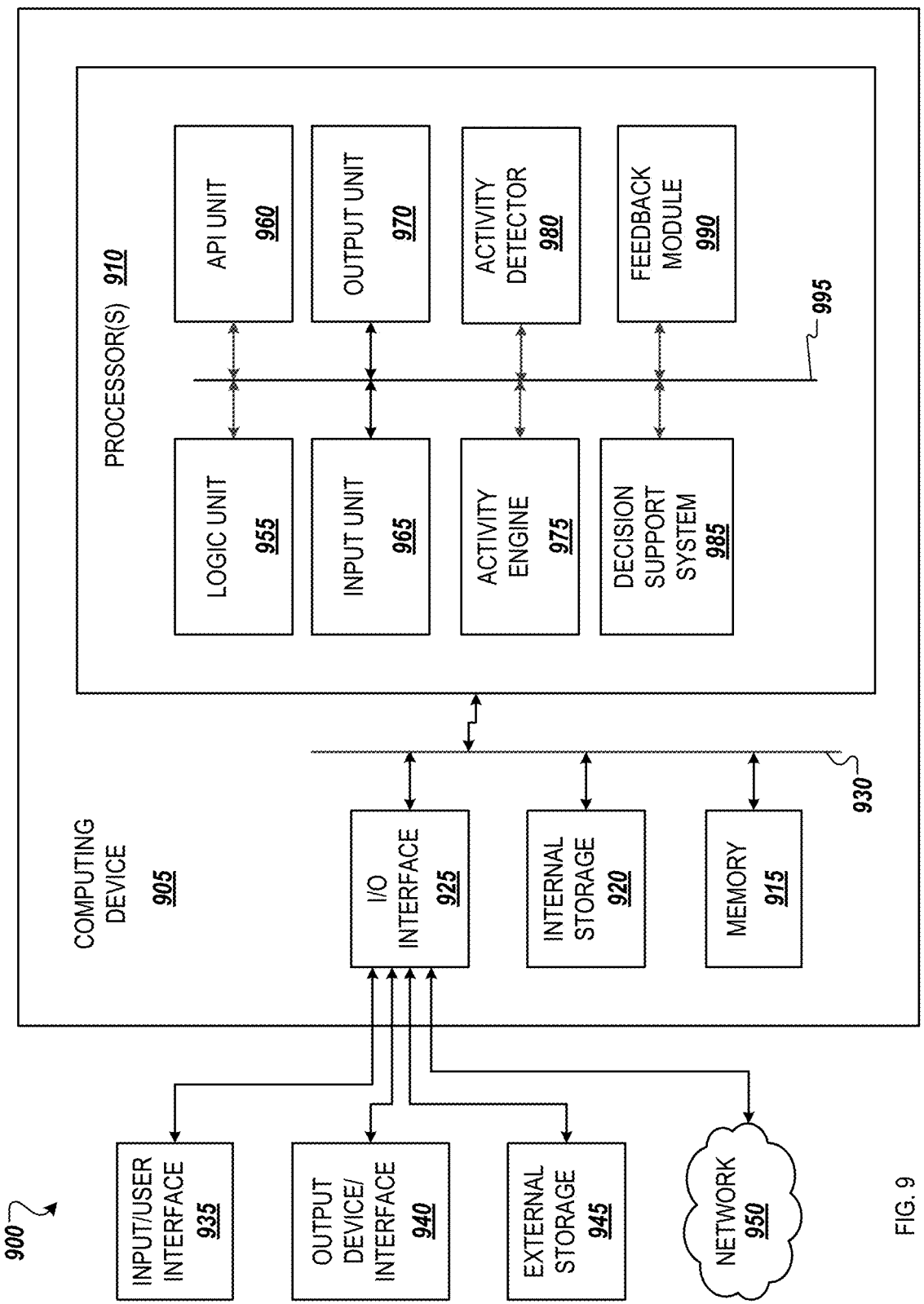
FIG. 9 illustrates an example server computing environment with an example computer device suitable for use in example implementations.

FIG. 9 shows an example computing environment with an example computing device associated with the external host for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

Output device/interface 940 may include a display, television, monitor, printer, speaker, braille, or the like. In some example implementations, input/user interface 935 and output device/interface 940 can be embedded with or physically coupled to the computing device 905. In other example implementations, other computing devices may function as or provide the functions of input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

The I/O interface 925 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, activity engine 975, activity detector 980, decision support system 985, and feedback module 990.

For example, input unit 965, activity engine 975, activity detector 980, decision support system 985, and feedback module 990 may implement one or more processes shown in FIGS. 2, 4-5 and 8. The described units and elements can be varied in design, function, configuration, or implementation and are not limited to the descriptions provided.

In some example implementations, when information or an execution instruction is received by API unit 960, it may be communicated to one or more other units (e.g., logic unit 955, output unit 970, input unit 580, input unit 965, activity engine 975, activity detector 980, decision support system 985, and feedback module 990).

Input unit 965 may, via API unit 960, interact with the activity engine 975 and activity detector 980 to provide the input information associated with an activity. Using API unit 960, decision support system 985 can analyze the information to identify activity patterns and generate a customized recommendation model for the user that redirects to perform a recovery plan. Feedback module 990 may refine the customized model with updated information, for example.

In some instances, logic unit 955 may be configured to control the information flow among the units and direct the services provided by API unit 960, input unit 965, output unit 970, input unit 965, activity engine 975, activity detector 980, decision support system 985, and feedback module 990 in some example implementations described above. For example, the flow of one or more processes or implementations may be controlled by logic unit 955 alone or in conjunction with API unit 960.

Figure 10:
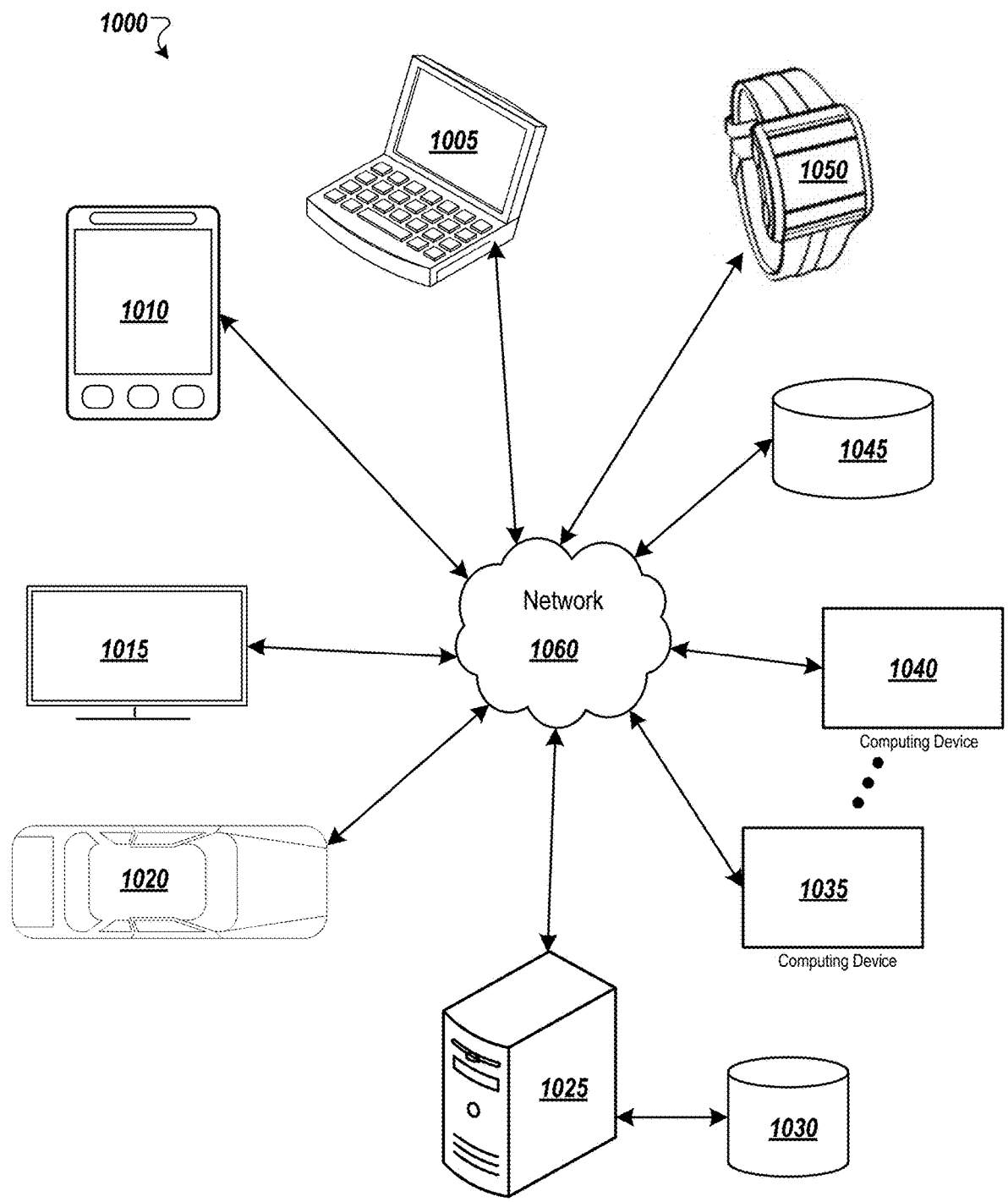
FIG. 10 illustrates an example networking environment with example computer devices suitable for use in example implementations.

FIG. 10 shows an example environment suitable for some example implementations. Environment 1000 includes devices 1005-1050, and each is communicatively connected to at least one other device via, for example, network 1060 (e.g., by wired and/or wireless connections). Some devices may be communicatively connected to one or more storage devices 1030 and 1045.

An example of one or more devices 1005-1050 may be computing devices 905 described in regards to FIG. 9, respectively. Devices 1005-1050 may include, but are not limited to, a computer 1005 (e.g., a laptop computing device) having a display and as associated webcam as explained above, a mobile device 1010 (e.g., smartphone or tablet), a television 1015, a device associated with a vehicle 1020, a server computer 1025, computing devices 1035-1040, storage devices 1030 and 1045. As explained above, the meeting environment of the user may vary, and is not limited to an office environment.

In some implementations, devices 1005-1020, 1050 may be considered user devices associated with the users of the enterprise. Devices 1025-1050 may be devices associated with client service (e.g., used by the users or administrators to provide services as described above and with respect to FIGS. 1-2, and/or store data, such as sensed data, pinpoint data, environment data, webpages, text, text portions, images, image portions, audios, audio segments, videos, video segments, and/or information thereabout).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "receiving," "analyzing," "determining," "generating," "identifying," "indicating," "detecting," "providing," "applying," "obtaining," "monitoring," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for providing a redirection, the method comprising:

receiving information associated with an activity;

analyzing the information to identify a first pattern and a second pattern, wherein the first pattern is related to work activities of a user and the second pattern is associated with a recovery activity in response to the work activities of the user, wherein the recovery activity comprises recreational environments other than an office or workplace where the work activities are performed;

generating a customized recommendation model for the second pattern based on the first pattern, wherein the customized recommendation model is generated based on, for each transition from the second pattern into the first pattern, correlating feedback information associated with a respective second pattern with positive performance measurements of a respective first pattern after transitioning into the respective first pattern from the respective second pattern;

in response to a detected trigger indicating a transition to the second pattern from the first pattern, assessing context factors to verify the transition to the second pattern without interrupting the first pattern;

in response to verifying the transition to the second pattern, determining a recovery plan for the second pattern to improve performance in the first pattern transitioned into from the second pattern by applying the customized recommendation model, the recovery plane comprising one or more of mental stimuli, physical stimuli, and social stimuli correlated to positive performance in the first pattern, and providing the redirection for the second pattern including the determined recovery plan;

receiving feedback information associated with the second pattern and performance measurements of the first pattern; and when the user repeatedly rejects a recommended activity for the recovery plan, updating the customized recommendation model to recommend a modified or different recovery plan based on the context factors and the received feedback information.

2. The method of claim 1, wherein analyzing further comprises:
identifying triggers that indicate a transition from the first pattern to the second pattern; and
determining context factors associated with the first pattern that are inconsistent with the second pattern.

3. The method of claim 1, wherein the recovery plan includes displaying an electronic game that directs a user to a location within a workplace setting.

4. The method of claim 1, wherein the customized recommendation model is generated using machine-learning associated with one or more of training data, user preferences, environmental controls, clinical guidelines, safety regulations, and social graphs.

5. The method of claim 1, wherein the detected trigger indicating a transition to the second pattern is based on one or more of tracking a user's body movements, location, and eye gaze.

6. The method of claim 1, wherein assessing context factors to verify the transition to the second pattern comprises identifying one or more of sensed data, pinpoint data, and environment data associated with the first pattern that override the trigger.

7. The method of claim 1, wherein the information includes one or more of sensed data, pinpoint data, and environment data.

8. The method of claim 1, wherein the information comprises one or more of location data, physiological data, computer usage, phone usage, and sensor data.

9. The method of claim 1,
wherein the feedback information comprises one or more of a duration for returning to the first pattern, tracking co-presence of another user, user location data, user survey, and post-break activity.

10. The method of claim 1, wherein the detected trigger indicating a transition to the second pattern is based on eye gaze.

11. The method of claim 1, the detected trigger is from a first source and the context factors are from at least a second source different from the first source.

12. A system for providing a redirection comprising:
a memory;
a processor operatively coupled to the memory, the processor configured to:
obtain information associated with an activity;
analyze the information to identify a first pattern and a second pattern, wherein the first pattern is related to work activities of a user and the second pattern is associated with a recovery activity in response to the work activities of the user, wherein the recovery activity comprises recreational environments other than an office or workplace where the work activities are performed;
generate a customized recommendation model for the second pattern based on the first pattern, wherein the customized recommendation model is generated based on, for each transition from the second pattern into the first pattern, correlating feedback information associated with a respective second pattern with positive performance measurements of a respective first pattern after transitioning into the respective first pattern from the respective second pattern; and
in response to a detected trigger indicating a transition to the second pattern from the first pattern, assess context factors to verify the transition to the second pattern without interrupting the first pattern;
in response to verifying the transition to the second pattern,
determine a recovery plan for the second pattern to improve performance in the first pattern transitioned into from the second pattern by applying the customized recommendation model, the recovery plane comprising one or more of mental stimuli, physical stimuli, and social stimuli correlated to positive performance in the first pattern, and
provide the redirection for the second pattern including the determined recovery plan;
receive feedback information associated with the second pattern and performance measurements of the first pattern; and
when the user repeatedly rejects a recommended activity for the recovery plan, update the customized recommendation model to recommend a modified or different recovery plan based on the context factors and the received feedback information.

13. The system of claim 12, wherein to analyze the information to identify a first pattern and a second pattern the processor further configured to:
identify triggers that indicate a transition from the first pattern to the second pattern; and
determine context factors associated with the first pattern that are inconsistent with the second pattern.

14. The system of claim 12, wherein the customized recommendation model is generated using machine-learning associated with one or more of training data, user preferences, environmental controls, clinical guidelines, safety regulations, and social graphs.

15. The system of claim 12, wherein to assess context factors to verify the transition to the second pattern, the processor further is configured to:
identify one or more of sensed data, pinpoint data, and environment data associated with the first pattern that override the trigger.

16. The system of claim 12, wherein feedback information comprises one or more of duration for returning to the first pattern, tracking co-presence of another user, user location data, user survey, and post-break activity.

17. A non-transitory computer readable medium, comprising instructions that when execute by a processor, the instructions to:
obtain information associated with an activity;
analyze the information to identify a first pattern and a second pattern, wherein the first pattern is related to work activities of a user and the second pattern is associated with a recovery activity in response to the work activities of the user, wherein the recovery activity comprises recreational environments other than an office or workplace where the work activities are performed;

generate a customized recommendation model for the second pattern based on the first pattern, wherein the customized recommendation model is generated based on, for each transition from the second pattern into the first pattern, correlating feedback information associated with a respective second pattern with positive performance measurements of a respective first pattern after transitioning into the respective first pattern from the respective second pattern; and in response to a detected trigger indicating a transition to the second pattern from the first pattern, assess context factors to verify the transition to the second pattern without interrupting the first pattern;

in response to verifying the transition to the second pattern, determine a recovery plan for the second pattern to improve performance in the first pattern transitioned into from the second pattern by applying the customized recommendation model, the recovery plane comprising one or more of mental stimuli, physical stimuli, and social stimuli correlated to positive performance in the first pattern, and provide the redirection for the second pattern including the determined recovery plan;

receive feedback information associated with the second pattern and performance measurements of the first pattern; and when the user repeatedly rejects a recommended activity for the recovery plan, update the customized recommendation model to recommend a modified or different recovery plan based on the context factors and the received feedback information.

18. The non-transitory computer readable medium of claim 17, wherein to analyze the information to identify a first pattern and a second pattern the instructions are further to:

identify triggers that indicate a transition from the first pattern to the second pattern; and determine context factors associated with the first pattern that are inconsistent with the second pattern.

19. The non-transitory computer readable medium of claim 17, wherein the customized recommendation model is generated using machine-learning associated with one or more of training data, user preferences, environmental controls, clinical guidelines, safety regulations, and social graphs.

20. The non-transitory computer readable medium of claim 17, wherein to assess context factors to verify the transition to the second pattern, the instructions are further to:

identify one or more of sensed data, pinpoint data, and environment data associated with the first pattern that override the trigger.

21. The non-transitory computer readable medium of claim 17, wherein feedback information comprises one or more of duration for returning to the first pattern, tracking co-presence of another user, user location data, user survey, and post-break activity.

* * * * *